(12) United States Patent
Kwon et al.

(10) Patent No.: US 7,911,147 B2
(45) Date of Patent: Mar. 22, 2011

(54) LIMITED CURRENT CIRCUIT OF DIGITAL INVERTER FOR LCD BACKLIGHT

(75) Inventors: Oh-Sang Kwon, Incheon (KR); Chang-Ho Lee, Gumi (KR); Yong-Kon Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 941 days.

(21) Appl. No.: 11/646,720

(22) Filed: Dec. 27, 2006

(65) Prior Publication Data
US 2008/0001554 A1 Jan. 3, 2008

(30) Foreign Application Priority Data

Jun. 30, 2006 (KR) .................... 10-2006-0061193

(51) Int. Cl.
*H05B 37/00* (2006.01)
(52) U.S. Cl. ............... 315/119; 315/209 R; 315/225; 315/291
(58) Field of Classification Search .......... 315/209 R, 315/224, 246–248, 225, 291, 307, 219, 260, 315/276, 119, 308; 345/102; 361/90, 91.1, 361/91.2
See application file for complete search history.

(56) References Cited

U.S. PATENT DOCUMENTS

| | | | |
|---|---|---|---|
| 6,294,879 B1 | 9/2001 | Nagase et al. | |
| 7,034,800 B2 * | 4/2006 | Nakatsuka et al. | 345/102 |
| 7,208,885 B2 * | 4/2007 | Hsu | 315/291 |
| 7,218,062 B1 * | 5/2007 | Wang et al. | 315/225 |
| 7,321,205 B2 * | 1/2008 | Hsieh | 315/291 |
| 2002/0163822 A1 * | 11/2002 | Lin | 363/98 |

FOREIGN PATENT DOCUMENTS

| | | |
|---|---|---|
| CN | 1717144 A | 1/2006 |
| GB | 2251993 | 7/1992 |
| KR | 20040020205 | * 3/2004 |

OTHER PUBLICATIONS

Combined Search and Examination Report dated Mar. 20, 2007 for corresponding Great Britain Application No. GB0625317.3.
Office Action issued in corresponding Chinese Patent Application No. 200610172283.3; issued Mar. 29, 2010.

\* cited by examiner

*Primary Examiner* — Jacob Y Choi
*Assistant Examiner* — Ephrem Alemu
(74) *Attorney, Agent, or Firm* — Brinks Hofer Gilson & Lione

(57) ABSTRACT

A limited current circuit of this invention comprising: a transformer that raises an alternating current (AC) power supplied from the digital inverter to an AC voltage of a high voltage to light a lamp; a voltage/current detection unit that detects at least one of the current and voltage supplied to the lamp; an A/D converter that converts the detected voltage/current value of analog to a digital value; and a microcontroller unit (MCU) that induces an LCC check point after the start of a striking process, compares at least one of the output current value and voltage value from the transformer with a preset reference value on the basis of an output signal of the A/D converter and then shuts down the inverter when the output current value or voltage value is determined to be abnormal, wherein the reference value comprises at least one of the current value and voltage value measured at the LCC check point when an object having noninductive resistance is not contacted to the inverter.

21 Claims, 4 Drawing Sheets

33.6mV

−1.6mV 20.0mV

LIMITED CURRENT CIRCUIT OF DIGITAL INVERTER FOR LCD BACKLIGHT

RELATED APPLICATION

The present disclosure claims the benefit of priority of Korean Application No. 10-2006-61193, filed on Jun. 30, 2006, which is herein expressly incorporated by reference in its entirety.

BACKGROUND

1. Technical Field

The present invention relates to an LCC (Limited Current Circuit) of a digital inverter for an LCD backlight, and more particularly, to an LCC of a digital inverter for an LCD backlight that can perform a stable protection function while meeting a standard specification.

2. Discussion of the Related Art

Generally, an inverter used for an LCD backlight uses a high voltage. The inverter has an international standard that is set so that current higher than a predetermined level cannot flow through a human body when a user is contacted with the inverter by taking the user's stability into account.

For this, in general, it is checked whether an Limited Current Circuit (LCC) of an inverter is properly operated in such a manner that a human body is set to a noninductive resistance of 2KΩ and the noninductive resistance is contacted to a second side of a transformer. When the noninductive resistance of 2KΩ is connected to a second side coil of the transformer that outputs a high voltage, the LCC is implemented using the phenomenon that a voltage value or current value output from the transformer become smaller than an output (reference voltage or reference current) at the time of normal operation. Specifically, when a striking process starts, the inverter gradually increases a voltage for driving a lamp. In a case where a noninductive resistance is electrically connected to the inverter, current also flows in the noninductive resistance. However, a voltage value higher than the international standard may flow through the noninductive resistance at any time. In this case, the voltage output to the transformer becomes lower than the output value of the transformer at the time of normal operation. That is, if the output value of the transformer is lower than the reference value (reference voltage or reference current), a protection circuit of the LCC is operated to shut down the inverter. For example, as shown in FIG. 1, the a comparator 12 outputs a shutdown signal to a shutdown enable latch 15 when an output voltage is lower than a reference voltage Vref by comparison between an output voltage of a transformer 11 for a master, whereby the inverter is shut down.

In the same manner, a comparator 14 outputs a shutdown signal to the shutdown enable latch 15 when an output voltage is lower than the reference voltage Vref by comparison between an output voltage of a transformer 13 for a slave and the reference voltage Vref, whereby the inverter is shut down. For reference, an LCC check is classified into a striking LCC and an operating LCC. The striking LCC is contacted to a noninductive resistance before an inverter operation and operated, and the operating LCC is contacted to a noninductive resistance during an inverter operation. That is, a separate LCC is operated before and after the operation of the inverter, respectively. FIG. 2 shows an output current waveform of a striking LCC of a related art inverter. An X-axis is time, and a y-axis is a voltage output from a transformer. As shown in FIG. 2, if it is asserted that an output value of the transformer is lower than a reference value (reference voltage or reference current), the LCC is operated, to thus abruptly shut off the voltage output from the transformer, thereby preventing a current higher than the international standard from flowing through a human body.

Recently, cases of applying a method of implementing the aforementioned LLC of analog control type to an inverter of digital control type are increasing. In the digital control type, a microcontroller unit (MCU) perform an arithmetic operation according to the order of a series of programs, and performs an LCC check after the completion of the operation. That is, the LCC does not operate while the MCU is carrying out the operation.

However, in the LCC requiring a high speed process, if the method of implementing the aforementioned LCC of analog control type is applied to the digital control type inverter, there is a problem that a delay time is generated according to the amount of operation of the MCU and current beyond the international standard may flow through a human body. For example, the MCU may perform an interrupt processing routine. In this case, a delay time may be generated since another operation cannot be performed. In addition, an operation delay of the MCU may be generated by an environment such as a low temperature and a high temperature, which renders difficulties in ensuring the reliability of a protection circuit such as an LCC.

BRIEF SUMMARY

An LCC of a digital inverter for an LCD backlight is disclosed that includes a transformer that raises a AC power supplied from the inverter to an AC voltage of a high voltage that lights a lamp; a voltage/current detection unit that detects at least one of the current and voltage supplied to the lamp; an A/D converter that converts the detected voltage/current value of analog to a digital value; and an MCU which induces an LCC check point after the start of a striking process, compares at least one of the output current value and voltage value from the transformer with a preset reference value on the basis of an output signal of the A/D converter and then shuts down the inverter when the output current value or voltage value is determined to be abnormal.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Hereinafter, a preferred embodiment of the present invention will be described with reference to the accompanying drawings.

Figure 1:
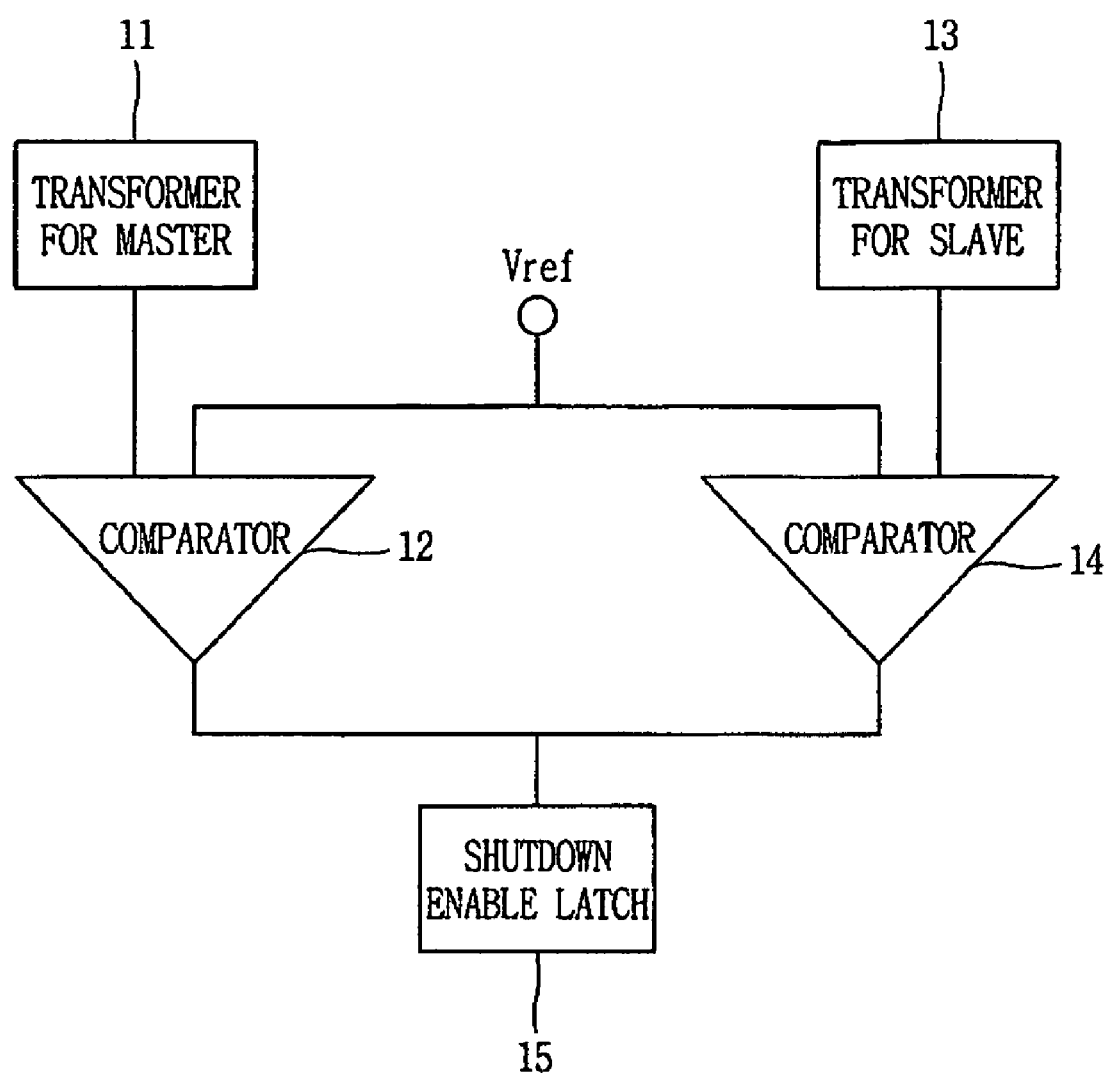
FIG. 1 is a block diagram of an LCC of a digital inverter for an LCC backlight according to the related art.
Figure 2:
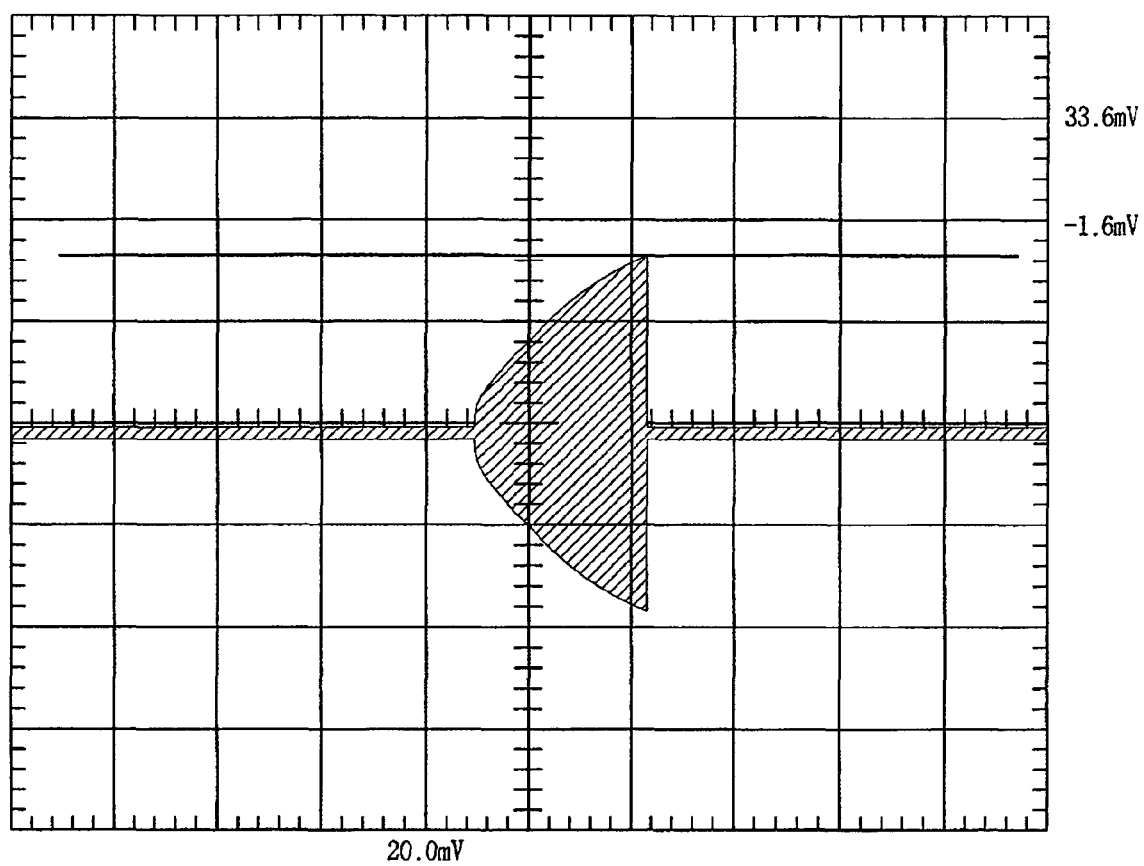
FIG. 2 is a shutdown waveform diagram according to the related art.
Figure 3:
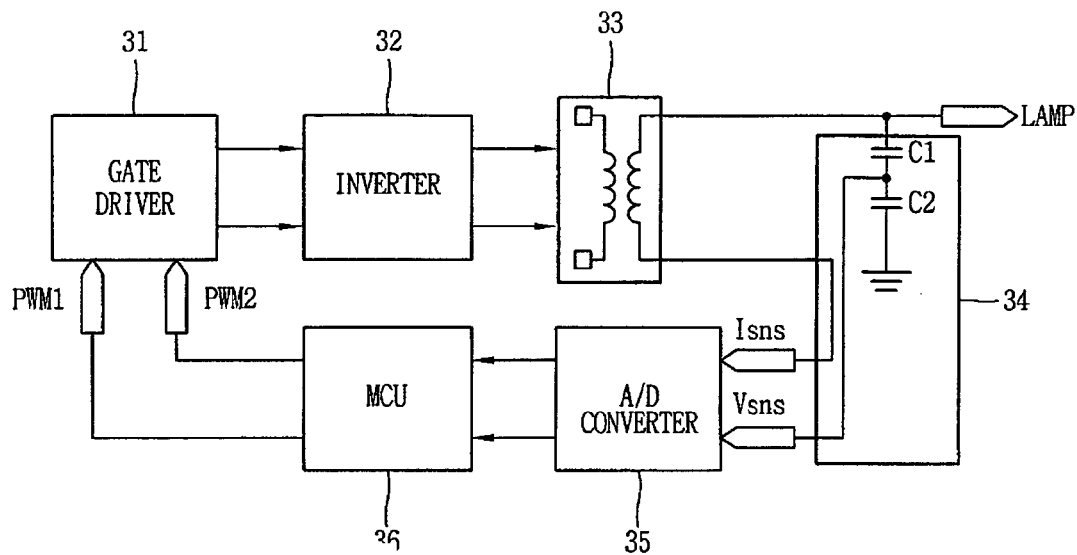
FIG. 3 is an LCC block diagram of a digital inverter for an LCC backlight.

FIG. 3 is an LCC block diagram of a digital inverter for an LCD backlight. As shown in FIG. 3, An LCC of a digital inverter for an LCD backlight includes: a gate driver 31 that generates a gate driving signal by using pulse width modulation signals PWM1 and PMW2 supplied from an MCU 36 to be described later; an inverter 32 that converts a voltage supplied from a power terminal VCC into an AC waveform by using a switching device switched by the gate driving signal and supplying the same to the transformer 33; a transformer 33 that raises the AC power supplied from the inverter 32 to an AC voltage of a high voltage for lighting a lamp LAMP; a voltage/current detection unit 34 that detects the current and/or voltage supplied to the lamp LAMP from the transformer 33; an A/D converter 35 that converts the voltage/current value of analog detected from the voltage/current detection unit 34 to a digital value; and an MCU which induces an LCC check point right after the start of a striking process, determines whether the output current and/or voltage value of the transformer 33 is normal or abnormal with respect to the check point on the basis of the output signal of the A/D converter 35 and then shuts down the inverter when the output current value or voltage value is determined to be abnormal. The operation of the thus-constructed LCC of the digital inverter for the LCD backlight will be described in detail with reference to FIGS. 3 to 5.

The gate driver 31 generates a gate driving signal by using pulse width modulation signals PWM1 and PWM2 input from the MCU 36, and supplies the generated gate driving signal to the inverter 32. The inverter 32 converts a voltage supplied from the power terminal VCC into an AC waveform to supply the same to a first takeup side.

The transformer 33 raises the AC power supplied from the inverter 32 into an AC voltage of a high voltage for lighting the lamp LAMP, and outputs the raised AC voltage of high voltage to the lamp side. At this time, the voltage/current detection unit 34 detects a current and voltage supplied to the lamp LAMP from the transformer 33, and the detected voltage/current value of analog is converted into a digital value by the A/D converter 35 and transferred to the MCU 36.

The MCU 36 reads voltage and current values supplied to the lamp LAMP through the A/D converter 35 at a predetermined time interval, and performs a static current control and protection function on the basis of the read voltage and current values. However, a digital controller such as the MCU 36 performs an arithmetic operation according to the order of a series of programs. The digital controller may be unable to perform another operation while performing an interrupt processing routine, which may easily cause a delay time. Therefore, at the time of an arithmetic operation, such as of an LCC, requiring a high speed processing, a malfunction or delayed operation may easily occur.

To prevent current beyond the standard from flowing through a human body when a delay time occurs, an MCU that induces striking is introduced so that a voltage value or current value lower than the maximum voltage or maximum current that may flow through the noninductive resistance from the start of a striking process until a limited current circuit check. That is, an MCU is introduced which induces striking so that a voltage value or current value output from the transformer is greater than a reference voltage when driven by striking. Here, the reference value comprises a current value or voltage value at an LCC check point at the time of normal operation with no noninductive resistance being electrically connected to the inverter 32. The reference value is set by taking the maximum current value or voltage value consistent with the international standard that may flow through the noninductive resistance.

Figure 4:
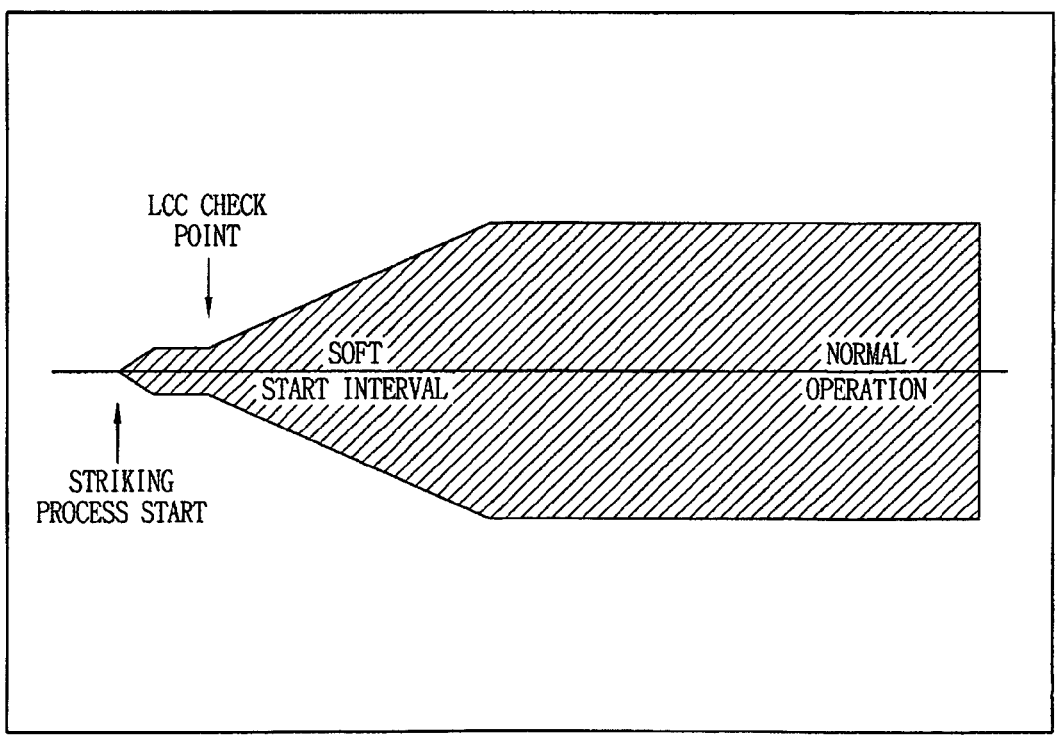
FIG. 4 is a striking waveform diagram.

By using the aforementioned MCU, a striking waveform as shown in FIG. 4 is induced, and then it is determined whether the output current value and/or output voltage value of the transformer 33 is normal/abnormal. When it is determined that they are abnormal, the inverter 32 is shut down. Here, if they are abnormal, it means that the output current value and/or output voltage value at the transformer 33 is smaller than the reference voltage. The X-axis of FIG. 4 is a time, and the y-axis is a voltage output from the transformer. FIG. 4 is a waveform diagram illustrating a normal operation with the LCC not in operation. The striking waveform induced by the MCU is a waveform of a voltage value output from the transformer during the time from the start of a striking process as shown in FIG. 4 until an LCC check point.

Concretely, the MCU controls a voltage value output from the transformer so that striking is induced to higher than an output value (reference value) at the time of normal operation from the start of a striking process of FIG. 4 until an LCC check point. The MCU controls a voltage flowing through the noninductive resistance so as to be smaller than a preset value (maximum voltage value or/and maximum current value that may flow through the MCU at the time of normal operation).

Figure 5:
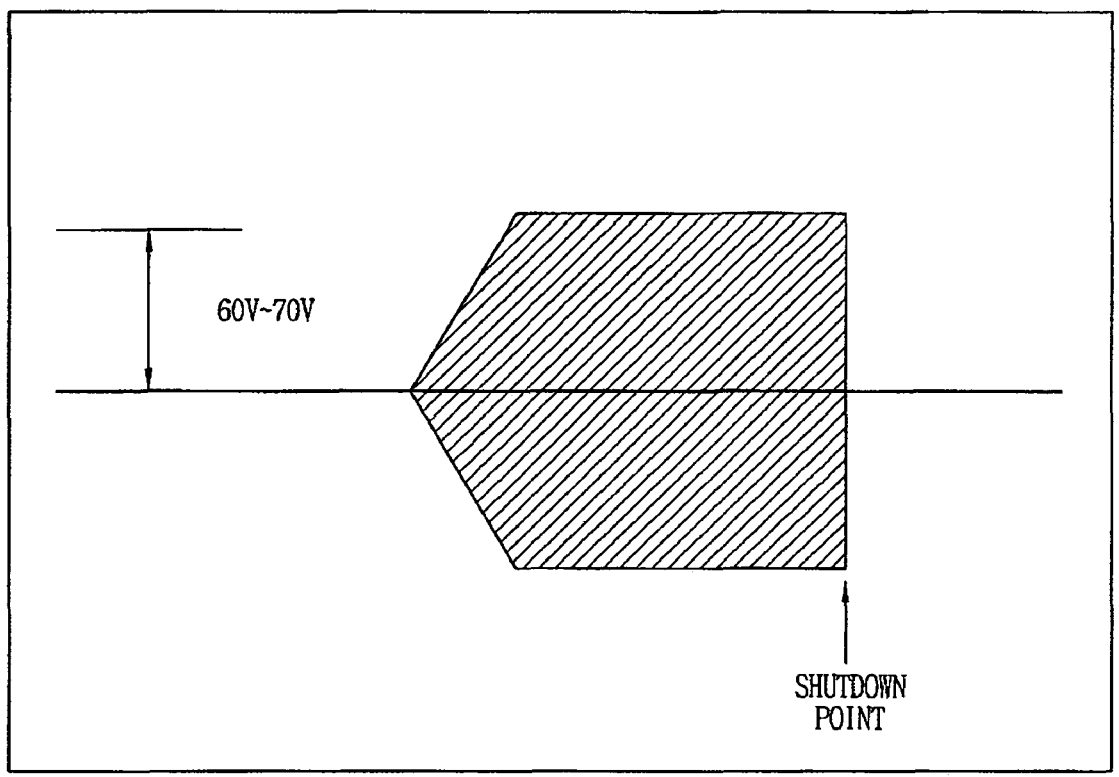
FIG. 5 is a shutdown waveform diagram.

For example, a limited current value I of the transformer 33 set in the international standard $F_o$[KHz]×0.7. Here, the frequency $F_0$ is a driving frequency of the inverter 32. Therefore, if the driving frequency $F_0$ of the inverter 32 is 65 KHz, the maximum values of the allowable current and voltage that may flow through the noninductive resistance 2KΩ with respect to a human body are 45.5 mA and 91V, respectively. Since the maximum voltage is 91V, as shown in FIG. 5, a positive voltage of the LCC check point of the striking waveform is controlled so as to be 60 to 70V by taking the reliability and stability of the LCC into account. That is, the MCU controls so that about 60 to 80% of the maximum voltage that may flow through the noninductive resistance can be a positive voltage (limited voltage). Accordingly, it is possible to prevent current beyond the standard from flowing through a human body due to an operation delay or the like.

Thereafter, if an output value of the transformer of the striking process is normal at the LCC check point, the LCC enters into a normal operation state through a soft start, thereby driving the lamp LAMP. However, if it is determined that the output value of the transformer is abnormal, the MCU immediately shuts down the inverter 32, so that the soft start is not carried out as shown in FIG. 5. In FIG. 5, the x-axis is a time, and the y-axis is a voltage value applied to the noninductive resistance.

The principle of the operation of the LCC will be described as follows. A human body operated with a resistance is electrically contacted with the inverter, and if an output value of the transformer at the LCC check point at the time of striking is smaller than an output value of the transformer at the LCC check point when the human body is not connected to the inverter (normal operation), it is determined that current higher than the international standard may flow through the human body. That is, it is determined that current or voltage higher than a current value or voltage value presently preset to the human body flows. Then, the LCC is operated and the inverter is shut down, thereby implementing a protection circuit that prevents a current higher than the international standard from flowing through the human body. Here, the output value of the transformer becomes lower than the output value of the transformer at the time of normal operation as much as the current value flown through the human body.

Here, when the MCU 36 determines whether the output current and voltage values of the transformer 33 are normal or abnormal on the basis of an output signal of the A/D converter 35 at the LCC check point with respect to an instantaneous value, there is a large possibility of malfunction. Since the circuit is actually different in its operating characteristics at a low temperature, an ambient temperature, and a high temperature, the environment condition should be taken into account.

An A/D conversion value is accumulated from an initial startup until the LCC check point and compared with a reference value. Here, the reference value is a numerical value preset in consideration of accumulation. That is, the MCU 36 is able to accumulate an output current value and/or output voltage value of the transformer 33 calculated on the basis of an output signal of the A/D converter 35 until the LCC check point, and determine whether it is abnormal or not on the basis of the result of comparison with the reference value.

The MCU is a digital control device, and may comprise a Digital Signal Processor (DSP).

As described above in detail, the present invention can simplify a circuit configuration for a safety standard (LCC), and ensure the LCC standard margin by performing a shutdown processing within a standard time by inducing striking lower than a limited voltage set in the standard by using an MCU capable of controlling a voltage applied upon striking of the digital inverter applied to an LCD backlight.

What is claimed is:

1. A limited current circuit (LCC) of a digital inverter for a liquid crystal display (LCD) backlight, comprising:
   a transformer that raises an alternating current (AC) power supplied from the digital inverter to an AC voltage of a high voltage to light a lamp;
   a voltage current detection unit that detects at least one of the current and voltage supplied to the lamp;
   an A/D converter that converts the detected voltage/current value of analog to a digital value; and
   a microcontroller unit (MCU) that induces an LCC check point after a start of a striking process, compares at least one of the output current value and voltage value from the transformer with a preset reference value on the basis of an output signal of the A/D converter and then shuts down the inverter when the output current value or voltage value is determined to be abnormal,
   wherein the reference value comprises at least one of the current value and voltage value measured at the LCC check point when an object having noninductive resistance is not contacted to the inverter, and
   wherein the MCU determines the output current value or output voltage value of the transformer to be abnormal if the output current value or output voltage value is smaller than the reference value at the LCC check point.

2. The LCC of claim 1, wherein the object includes a human body.

3. The LCC of claim 1, wherein the MCU accumulates an output current value or output voltage value of the transformer on the basis of an output signal of the analog/digital (A/D) converter until the LCC check point, and determine whether the output current value or the output voltage value is abnormal based on a result of a comparison with the reference value.

4. A limited current circuit (LCC) of a digital inverter for a liquid crystal display (LCD) backlight, comprising:
   an inverter that converts a voltage supplied from a power terminal into an alternating current (AC) waveform;
   a transformer that receives the voltage output from the inverter and raises the voltage output to an AC voltage of a high voltage to light a lamp;
   a voltage current detection unit that detects at least one of a current value or a voltage value supplied to the lamp from the transformer;
   an analog/digital (A/D) converter that converts the voltage value or the /current value detected from the voltage/current detection unit to a digital value; and
   a digital control device that initiates an LCC check point right after a start of a striking process, and controls a voltage value or current value flowing through an object having noninductive resistance connected to the inverter during the time between the start of the striking process and the LCC check point so as to be smaller than the maximum voltage value or maximum current value that flow through the noninductive resistance.

5. The LCC of claim 4, wherein the digital control device shuts down the inverter when the voltage value or current value flowing through the noninductive resistance connected to the inverter is greater than the maximum voltage value or maximum current value that flows through the noninductive resistance at the LCC check point.

6. The LCC of claim 4, wherein the digital control device includes any one of a Micro Controlling Unit (MCU) and a digital signal processor (DSP).

7. The LCC of claim 6, wherein when the noninductive resistance is 2kΩ, and the driving frequency $F_0$ of the inverter is 65 KHz, the MCU controls the voltage value flowing through the noninductive resistance until the LCC check point after the start of the striking process to maintain a value of 60 to 70V with respect to a zero point.

8. The LCC of claim 6, wherein a ratio of the voltage value controlled by the MCU until the LCC check point after the start of the striking process with respect to the maximum voltage value that flows through the noninductive resistance comprises a range of 1:0.6 to 1:0.8.

9. A limited current circuit (LCC) apparatus of a digital inverter for a liquid crystal display (LCD) backlight, comprising:
   a transformer that raises an alternating current (AC) power supplied from the digital inverter to an AC voltage of a high voltage to light a lamp;
   voltage current detection means for detecting at least one of a current value and a voltage value supplied to the lamp;
   A/D converter means for converting the detected voltage value or the detected current value to a digital value; and
   means for inducing an LCC check point after a start of a striking process, wherein the means for inducing is further configured to compare at least one of the output current value and voltage value from the transformer with a preset reference value on the basis of an output signal of the A/D converter means and then shuts down the digital inverter when the output current value or voltage value is determined to be abnormal,
   wherein the reference value comprises at least one of the current value and voltage value measured at the LCC check point when an object having noninductive resistance is not contacted to the inverter, and
   wherein the means for inducing comprises means for determining the output current value or output voltage value of the transformer to be abnormal if the output current value or output voltage value is smaller than the reference value at the LCC check point.

10. The LCC apparatus of claim 9, wherein the object includes a human body.

11. The LCC apparatus of claim 9, wherein the means for inducing comprises means for accumulating an output current value or output voltage value of the transformer on the basis of an output signal of the analog/digital (A/D) converter until the LCC check point, wherein the means for inducing is further configured to determine whether the output current value or the output voltage value is abnormal based on a result of a comparison with the reference value.

12. A limited current circuit (LCC) apparatus of a digital inverter for a liquid crystal display (LCD) backlight, comprising:
inverting means for converting a voltage supplied from a power terminal into an alternating current (AC) waveform;
a transformer that receives the voltage output from the inverter and raises the voltage output to an AC voltage of a high voltage to light a lamp;
voltage/current detection means for detecting at least one of a current value or a voltage value supplied to the lamp from the transformer;
analog/digital (A/D) converter means for converting the voltage value or current value detected from the voltage/current detection unit to a digital value; and
digital control means for initiating an LCC check point right after a start of a striking process, wherein the digital control means for initiating is configured to controls a voltage value or a current value flowing through an object having noninductive resistance connected to the inverting means during the time between the start of the striking process and the LCC check point so as to be smaller than the maximum voltage value or maximum current value that flow through the noninductive resistance.

13. The LCC apparatus of claim 12, wherein the digital control means for initiating is further configured to shut down the inverting means when the voltage value or current value flowing through the noninductive resistance connected to the inverting means is greater than the maximum voltage value or maximum current value that flows through the noninductive resistance at the LCC check point.

14. The LCC apparatus of claim 12, wherein when the noninductive resistance is 2kΩ, and the driving frequency $F_0$ of the inverter is 65 KHz, the digital control means for initiating is configured to control the voltage value flowing through the noninductive resistance until the LCC check point after the start of the striking process to maintain a value of 60 to 70V with respect to a zero point.

15. The LCC apparatus of claim 12, wherein a ratio of the voltage value controlled by the digital control means for initiating until the LCC check point after the start of the striking process with respect to the maximum voltage value that flows through the noninductive resistance comprises a range of 1:0.6 to 1:0.8.

16. A method for controlling a limited current circuit (LCC) of a digital inverter for a liquid crystal display (LCD) backlight, the method comprising:
raising an alternating current (AC) power supplied from a digital inverter to an AC voltage of a high voltage to light a lamp;
detecting at least one of a current value and a voltage value supplied to the lamp;
converting the detected voltage value or the detected current value of analog to a digital value; and
inducing an LCC check point after the start of a striking process; and comparing at least one of the output current value and the output voltage value from the transformer with a preset reference value on the basis of an output signal and then shuts down the digital inverter when the output current value or voltage value is determined to be abnormal,
wherein the reference value comprises at least one of the current value and voltage value measured at the LCC check point when an object having noninductive resistance is not contacted to the inverter, and
wherein inducing an LCC check point comprises determining the output current value or the output voltage value to be abnormal when the output current value or output voltage value is smaller than the reference value at the LCC check point.

17. The method of claim 16, wherein the object includes a human body.

18. The LCC method of claim 16, wherein inducing an LCC check point comprises accumulating an output current value or an output voltage value on the basis of an output signal until the LCC check point, wherein inducing further comprises determining whether the output current value or the output voltage value is abnormal based on a result of a comparison with the reference value.

19. A method for controlling a limited current circuit (LCC) of a digital inverter for a liquid crystal display (LCD) backlight, the method comprising:
converting a voltage supplied from a power terminal into an alternating current (AC) waveform;
raising the voltage output to an AC voltage of a high voltage to light a lamp;
detecting at least one of a current value or a voltage value supplied to the lamp from the transformer;
converting the detected voltage value or the detected current value;
initiating an LCC check point right after a start of a striking process; and controlling a voltage value or a current value flowing through an object having noninductive resistance connected to the digital inverter during the time between the start of the striking process and the LCC check point so as to be smaller than the maximum voltage value or maximum current value that may flow through the noninductive resistance.

20. The LCC method of claim 19, wherein initiating an LCC check comprises shutting down the digital inverter when the voltage value or current value flowing through the noninductive resistance connected to the digital inverter is greater than the maximum voltage value or maximum current value that flows through the noninductive resistance at the LCC check point.

21. The LCC method of claim 19, wherein when the noninductive resistance is 2kΩ, and the driving frequency $F_0$ of the inverter is 65 KHz, and wherein initiating comprises controlling the voltage value flowing through the noninductive resistance until the LCC check point after the start of the striking process to maintain a value of 60 to 70V with respect to a zero point.

* * * * *